(12) United States Patent
Lee et al.

(10) Patent No.: US 12,237,545 B2
(45) Date of Patent: Feb. 25, 2025

(54) ELECTRODE ROLL CONNECTION AUTOMATION APPARATUS

(71) Applicant: LG Energy Solution, Ltd., Seoul (KR)

(72) Inventors: Young Soo Lee, Daejeon (KR); Jin Soo Lee, Daejeon (KR); Hong Ju Hwang, Daejeon (KR); Seung Hoo Lee, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 144 days.

(21) Appl. No.: 17/917,742

(22) PCT Filed: Jul. 6, 2021

(86) PCT No.: PCT/KR2021/008587
§ 371 (c)(1),
(2) Date: Oct. 7, 2022

(87) PCT Pub. No.: WO2022/014935
PCT Pub. Date: Jan. 20, 2022

(65) Prior Publication Data
US 2023/0163431 A1    May 25, 2023

(30) Foreign Application Priority Data
Jul. 14, 2020  (KR) .................. 10-2020-0087017

(51) Int. Cl.
*B32B 41/00*   (2006.01)
*B65H 35/00*   (2006.01)
*H01M 50/536*  (2021.01)

(52) U.S. Cl.
CPC ...... *H01M 50/536* (2021.01); *B65H 35/0006* (2013.01); *B65H 2301/122* (2013.01); *B65H 2701/19* (2013.01)

(58) Field of Classification Search
CPC .. H01M 50/536; H01M 50/50; H01M 10/052; H01M 2220/20; H01M 2220/30;
(Continued)

(56) References Cited

U.S. PATENT DOCUMENTS 9,947,956 B2 *  4/2018  Hwang ............ H01M 10/0409
2001/0046623 A1  11/2001  Akahira
(Continued)

FOREIGN PATENT DOCUMENTS

CN    1671609 A    9/2005
CN    109802164 A  5/2019
(Continued)

OTHER PUBLICATIONS

Extended European Search Report including Written Opinion for Application No. 21841851.5 dated Oct. 19, 2023, pp. 1-8.
(Continued)

*Primary Examiner* — Michael N Orlando
*Assistant Examiner* — Joshel Rivera
(74) *Attorney, Agent, or Firm* — Lerner David LLP

(57) ABSTRACT

An electrode roll connection automation apparatus is configured for uniformly maintaining the width of electrode tabs in a process of connecting electrode sheets to each other and for automatically connecting the electrode sheets to each other. The electrode roll connection automation apparatus includes first and second supply units, a connection unit, and an electrode tab sensing unit. The first and the second supply units are configured to supply first and second electrode sheets, respectively, on which electrode tabs are formed. The connection unit is configured to connect the first electrode sheet and the second electrode sheet to each other. The electrode tab sensing unit is disposed between the first
(Continued)

supply unit and the connection unit. The electrode tab sensing unit is configured to measure the distance between the electrode tabs.

13 Claims, 5 Drawing Sheets

(58) Field of Classification Search
CPC .. H01M 4/04; H01M 50/531; B65H 35/0006; B65H 2301/122; B65H 2701/19; B65H 19/102; B65H 19/1852; B65H 23/046; B65H 2301/46013; B65H 2301/46171; B65H 2301/46222; B65H 2801/72; B65H 19/20; B65H 2301/4631; B65H 2553/80; Y02E 60/10
USPC .................... 156/60, 64, 350, 351, 378, 379
See application file for complete search history.

(56) References Cited

U.S. PATENT DOCUMENTS

| | | |
|---|---|---|
| 2004/0161665 A1 | 8/2004 | Akahira |
| 2014/0361065 A1 | 12/2014 | Ishimatsu et al. |
| 2020/0139569 A1 | 5/2020 | Wi et al. |

FOREIGN PATENT DOCUMENTS

| | | |
|---|---|---|
| JP | H06183616 A | 7/1994 |
| JP | 2000138053 A | 5/2000 |
| JP | 2008127093 A | 6/2008 |
| JP | 2013165024 A | 8/2013 |
| JP | 6145383 B2 | 6/2017 |
| KR | 20130105001 A | 9/2013 |
| KR | 101479724 B1 | 1/2015 |
| KR | 20160133264 A | 11/2016 |
| KR | 101819729 B1 | 3/2018 |
| KR | 101857396 B1 | 5/2018 |
| KR | 102043024 B1 | 11/2019 |
| KR | 20190127283 A | 11/2019 |

OTHER PUBLICATIONS

Search report from International Application No. PCT/KR2021/008587, mailed Oct. 8, 2021.
Search Report dated Nov. 28, 2024 from the Office Action for Chinese Application No. 202180017608.3 Issued Nov. 29, 2024 pp. 1-2.

* cited by examiner

ELECTRODE ROLL CONNECTION AUTOMATION APPARATUS

CROSS-REFERENCE TO RELATED APPLICATIONS

The present application is a national phase entry under 35 U.S.C. § 371 of International Application No. PCT/KR2021/008587 filed on Jul. 6, 2021, and now published as WO 2022/014935 A1, which claims priority from Korean Patent Application No. 10-2020-0087017 filed on Jul. 14, 2020, all of which are hereby incorporated herein by reference in their entireties.

FIELD

The present invention relates to an electrode roll connection automation apparatus, and more particularly to an electrode roll connection automation apparatus including an electrode tab sensing unit configured to measure the distance between electrode tabs such that cutting intervals of two electrode sheets are uniformly maintained in a moving direction of the electrode sheets during a process of connecting the electrode sheets to each other.

BACKGROUND

A lithium secondary battery, which is capable of being charged and discharged, has been widely used as an energy source for wireless mobile devices or wearable devices, which are worn on bodies, and has also been used as an energy source for electric vehicles and hybrid electric vehicles presented as alternatives to existing gasoline and diesel vehicles, which cause air pollution.

In the lithium secondary battery, a positive electrode and a negative electrode are stacked in the state in which a separator is interposed therebetween, and lithium ions move between the positive electrode and the negative electrode, whereby the lithium secondary battery is repeatedly charged and discharged.

A process of manufacturing an electrode including the positive electrode and the negative electrode includes a step of coating the remaining part of an electrode sheet wound in the form of a roll, excluding parts at which electrode tabs are to be formed, with an electrode agent, a step of drying and rolling the electrode agent, a step of slitting the electrode sheet, and a step of notching the slit electrode sheet into unit electrodes.

An electrode manufacturing process is performed as a roll-to-roll continuous process. In the case in which an electrode roll wound in the form of a roll is completely consumed while electrodes are continuously manufactured using the electrode roll, a worker stops equipment, connects a tip of the electrode roll that is being used and a tip of a new electrode roll to each other using a tape, and reoperates the equipment.

When the tip of the electrode roll that is being used and the tip of the new electrode roll are connected to each other using the tape, however, a difference in width between electrode tabs may occur. Such a difference may increase in the case in which skill of the worker is low.

In addition, when an electrode sheet is cut at a uniform speed to manufacture unit electrodes while the electrode sheet is transferred at the uniform speed, the cutting position is changed when the electrode sheet is cut into the unit electrodes if the difference in width between electrode tabs occurs, whereby defective electrodes are produced.

In connection therewith, Patent Document 1 discloses an electrode production system including a member configured to automatically perform replacement of an electrode material mounted to one of a plurality of electrode material supply reels to an electrode material mounted with another electrode material supply reel but does not disclose technology capable of connecting the electrode materials to each other while uniformly maintaining the distance between electrode tabs.

Patent Document 2 relates to an electrode sheet cutting apparatus including a sensing unit configured to sense a notching recess of an electrode sheet and to generate a notching recess sensing signal and a cutting unit configured to cut the portion of the electrode sheet at which the notching recess is located when passing through a cutting point in response to the notching recess sensing signal generated by the sensing unit and a cutting method.

However, Patent Document 2 neither teaches nor discloses a method of connecting two electrode sheets to each other such that the width of electrode tabs is uniform and an apparatus related thereto.

In addition, Patent Document 3 discloses an automatic electrode film replacement apparatus but does not disclose technology for checking the distance between electrode tabs when electrode films are connected to each other.

Therefore, there is a high necessity for technology capable of connecting electrode sheets so as to have uniform quality irrespective of skill of a worker and uniformly maintaining the width of electrode tabs, whereby it is possible to prevent occurrence of defects at the time of cutting the electrode sheets into unit electrodes.

PRIOR ART DOCUMENT (Patent Document 1) Korean Registered Patent Publication No. 10-1857396 (2018 Mary 11)
(Patent Document 2) Korean Patent Application Publication No. 2019-0127283 (2019 Nov. 13)
(Patent Document 3) Korean Patent Application Publication No. 2016-0133264 (2016 Nov. 22)

SUMMARY OF THE DISCLOSURE

The present invention has been made in view of the above problems, and it is an object of the present invention to provide an electrode roll connection automation apparatus capable of maintaining the width of electrode tabs so as to have a uniform size when electrode sheets are connected to each other, whereby it is possible to prevent occurrence of defects at the time of electrode cutting, and continuously supplying electrode rolls without interruption in an electrode manufacturing process.

In order to accomplish the above object, an electrode roll connection automation apparatus according to the present invention includes a first supply unit configured to supply a first electrode sheet having electrode tabs formed thereon, a second supply unit configured to supply a second electrode sheet having electrode tabs formed thereon, a connection unit configured to connect the first electrode sheet and the second electrode sheet to each other, and an electrode tab sensing unit disposed between the first supply unit and the connection unit, the electrode tab sensing unit being configured to measure the distance between the electrode tabs.

In the electrode roll connection automation apparatus according to the present invention, the second supply unit may be configured to have a structure in which the second supply unit is unwound in order to supply the second electrode sheet so as to be connected to the first electrode sheet and in which the second supply unit is rewound in order to rewind the first electrode sheet and the second electrode sheet after the first electrode sheet and the second electrode sheet are connected to each other.

In the electrode roll connection automation apparatus according to the present invention, the electrode tab sensing unit may include a transmitter configured to transmit a signal and a receiver configured to receive the signal, the transmitter and the receiver being disposed so as to face each other, and the electrode tab sensing unit may measure the distance between the electrode tabs of the first electrode sheet while the electrode tabs pass between the transmitter and the receiver.

In the electrode roll connection automation apparatus according to the present invention, the connection unit may include a cutter configured to cut a tip of a start portion of the first electrode sheet such that the distance between the electrode tabs measured by the electrode tab sensing unit is maintained when the first electrode sheet and the second electrode sheet are connected to each other.

The electrode roll connection automation apparatus according to the present invention may further include a tape attachment unit configured to connect the first electrode sheet and the second electrode sheet to each other.

In the electrode roll connection automation apparatus according to the present invention, a recess may be formed in an outer edge of the first electrode sheet at which no electrode tabs are formed, which is one of opposite side outer edges of the first electrode sheet in a moving direction thereof, and the electrode roll connection automation apparatus may further include an edge position control (EPC) sensor configured to sense the position of the recess.

In addition, the moving direction of the first electrode sheet or the second electrode sheet may be adjusted in response to sensing of the EPC sensor.

The present invention provides an automatic electrode roll connection method using the electrode roll connection automation apparatus. Specifically, the automatic electrode roll connection method includes (a) unwinding a first electrode sheet, (b) measuring the distance between electrode tabs while the first electrode sheet passes through the electrode tab sensing unit, (c) cutting a tip of a start portion of the first electrode sheet based on the distance between the electrode tabs, and (d) connecting the first electrode sheet and a second electrode sheet to each other.

In the automatic electrode roll connection method according to the present invention, step (b) may be performed using a sensor capable of measuring the distance between the electrode tabs.

In the automatic electrode roll connection method according to the present invention, step (b) may be performed together with a process of sensing the position of a recess of the first electrode sheet.

In addition, the present invention provides electrode sheets connected to each other using the electrode roll connection automation apparatus, wherein the width of a unit electrode formed at connection portions of the first electrode sheet and the second electrode sheet is equal to the width of a unit electrode of the first electrode sheet and the width of a unit electrode of the second electrode sheet.

As is apparent from the above description, an electrode roll connection automation apparatus according to the present invention is configured such that a process of connecting electrode sheets to each other is automatically performed, whereby it is possible to connect the electrode sheets to each other so as to have uniform quality irrespective of skill of a worker.

In addition, since an electrode tab sensing unit is included, it is possible to connect the electrode sheets to each other such that the width of electrode tabs is uniformly maintained.

In addition, since an EPC sensor is used, it is possible to connect a first electrode sheet and a second electrode sheet to each other such that the first electrode sheet and the second electrode sheet are uniformly aligned in a moving direction thereof.

Consequently, it is possible to prevent manufacture of defective unit electrodes due to a difference in width between the electrode tabs during a cutting process for manufacturing unit electrodes.

DETAILED DESCRIPTION

Now, preferred embodiments of the present invention will be described in detail with reference to the accompanying drawings such that the preferred embodiments of the present invention can be easily implemented by a person having ordinary skill in the art to which the present invention pertains. In describing the principle of operation of the preferred embodiments of the present invention in detail, however, a detailed description of known functions and configurations incorporated herein will be omitted when the same may obscure the subject matter of the present invention.

In addition, the same reference numbers will be used throughout the drawings to refer to parts that perform similar functions or operations. In the case in which one part is said to be connected to another part throughout the specification, not only may the one part be directly connected to the other part, but also, the one part may be indirectly connected to the other part via a further part. In addition, that a certain element is included does not mean that other elements are excluded, but rather means that such elements may be further included unless mentioned otherwise.

In addition, a description to embody elements through limitation or addition may be applied to all inventions, unless particularly restricted, and does not limit a specific invention.

Also, in the description of the invention and the claims of the present application, singular forms are intended to include plural forms unless mentioned otherwise.

Also, in the description of the invention and the claims of the present application, "or" includes "and" unless mentioned otherwise. Therefore, "including A or B" means three cases, namely, the case including A, the case including B, and the case including A and B.

In addition, all numeric ranges include the lowest value, the highest value, and all intermediate values therebetween unless the context clearly indicates otherwise.

Embodiments of the present invention will be described in detail with reference to the accompanying drawings.

Figure 1:
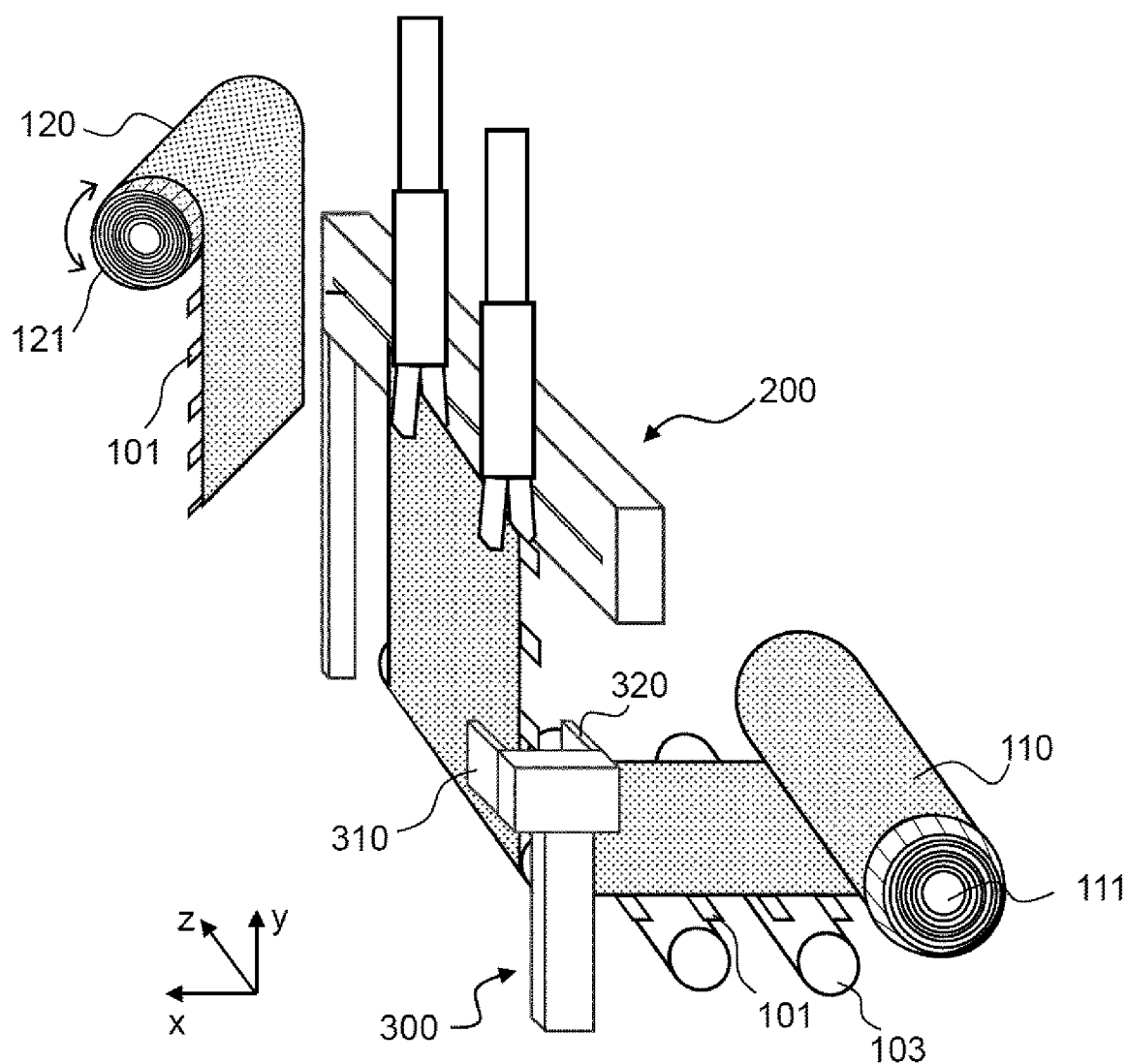
FIG. 1 is a perspective view of an electrode roll connection automation apparatus according to an embodiment.

FIG. 1 is a perspective view of an electrode roll connection automation apparatus according to an embodiment.

Referring to FIG. 1, the electrode roll connection automation apparatus includes a first supply unit configured to supply a first electrode sheet 110 having electrode tabs 101 formed thereon, a second supply unit configured to supply a second electrode sheet 120 having electrode tabs 101 formed thereon, a connection unit 200 configured to connect the first electrode sheet 110 and the second electrode sheet 120 to each other, and an electrode tab sensing unit 300 disposed between the first supply unit and the connection unit 200, the electrode tab sensing unit 300 being configured to measure the distance between the electrode tabs 101.

When the second electrode sheet, which is a moving electrode, is completely consumed during an electrode manufacturing process performed as a roll-to-roll continuous process, it is necessary to perform a process of connecting the first electrode sheet, which is a standby electrode, to a tip of the second electrode sheet.

For the electrode sheet having the electrode tabs formed thereon, a difference in width between the electrode tabs may occur depending on the position of connection portions of the moving electrode and the standby electrode. If the difference in width between the electrode tabs occurs, a cutting position may be changed during a process of cutting the electrode sheet into unit electrodes, whereby a plurality of defective electrodes may be formed.

Therefore, the distance between the electrode tabs of the first electrode sheet is measured before the first electrode sheet and the second electrode sheet are connected to each other such that the distance between the electrode tabs is uniform when the first electrode sheet and the second electrode sheet are connected to each other. The distance between the electrode tabs is measured during a process in which the electrode tabs of the first electrode sheet pass through the electrode tab sensing unit 300. Measurement of the distance between the electrode tabs will be described in detail below.

The cutting position of a tip of a start portion of the first electrode sheet may be accurately calculated based on the distance between the electrode tabs measured as described above. The tip of the start portion of the first electrode sheet may be cut based on a value calculated as described above.

At this time, the portion of the first electrode sheet to be cut is determined in consideration of the position of a tip of an end portion of the second electrode sheet. Preferably, the tip of the end portion of the second electrode sheet is cut such that an electrode tab is disposed at a connection portion of the second electrode sheet. The end portion of the second electrode sheet may be cut to form the connection portion of the second electrode sheet such that the width of the electrode tab formed at the connection portion of the second electrode sheet is 50% of the width of the other electrode tabs.

Consequently, a connection portion of the first electrode sheet is formed at the tip of the start portion of the first electrode sheet such that an electrode tab having a size equal to 50% of the width of the other electrode tabs, and the electrode tab formed at the connection portion of the first electrode sheet and the electrode tab formed at the connection portion of the second electrode sheet are connected to each other by butt welding, whereby an electrode tab having a width equal to the width of the other electrode tabs may be formed.

As described above, the first electrode sheet and the second electrode sheet are connected to each other in the state in which the connection portion of the second electrode sheet and the connection portion of the first electrode sheet are disposed so as not to overlap each other, whereby the electrode sheets may be connected to each other such that width of the electrode tabs and the distance between the electrode tabs are uniformly maintained.

As described above, the first electrode sheet and the second electrode sheet may be connected to each other such that the distance between the electrode tabs is uniformly maintained. Consequently, the cutting interval is uniformly maintained during a process of cutting the connected electrode sheets into unit electrodes. Consequently, it is possible to prevent occurrence of a problem in that defective electrodes are formed due to deviation of the cutting position at which the electrode sheet is cut into unit electrodes in the case in which the distance between the electrode tabs is changed in a conventional process of connecting the moving electrode and the standby electrode.

In the first supply unit shown in FIG. 1, a first roller 111 is unwound in order to withdraw the first electrode sheet 110, and a plurality of transfer rollers 103 is disposed at the lower surface of the first electrode sheet 110 to transfer the first electrode sheet 110 in an x-axis direction.

Alternatively, a gripper may transfer the first electrode sheet 110 in a state of gripping opposite side tips of the first electrode sheet.

The second supply unit is configured to have a structure in which a second roller 121 is unwound in order to supply the second electrode sheet 120 so as to be connected to the first electrode sheet 110 and in which the second roller 121 is rewound in order to rewind the first electrode sheet 110 and the second electrode sheet 120 after the first electrode sheet and the second electrode sheet are connected to each other.

In the electrode tab sensing unit 300, a transmitter 310 configured to transmit a signal and a receiver 320 configured to receive the signal are disposed so as to face each other, and the distance between the electrode tabs 101 of the first electrode sheet 110 is measured while the electrode tabs 101 pass between the transmitter 310 and the receiver 320.

In a concrete example, when the transmitter 310 transmits light or a wavelength toward the receiver 320, the light or the wavelength is reflected or blocked by the electrode tab 101 while the electrode tab 101 passes between the transmitter 310 and the receiver 320, whereby the light or the wavelength does not reach the receiver. When the portion of the first electrode sheet at which no electrode tab is formed passes between the transmitter 310 and the receiver 320, on the other hand, the light or the wavelength may reach the receiver.

The time for which the light or the wavelength transmitted by the transmitter reaches or does not reach the receiver may be calculated together with the moving speed of the first electrode sheet, whereby the width of the electrode tab and the distance between the electrode tabs may be calculated. The first electrode sheet may be cut at the point corresponding to 50% of the width of the electrode tab based on the calculated value. Consequently, a connection portion of the first electrode sheet that is connected to the second electrode sheet may be prepared.

The width of the electrode tab and the distance between the electrode tabs may be calculated using the above method.

However, a method of the electrode tab sensing unit sensing the distance between the electrode tabs and the width of the electrode tab is not limited to the above method.

Figure 2:
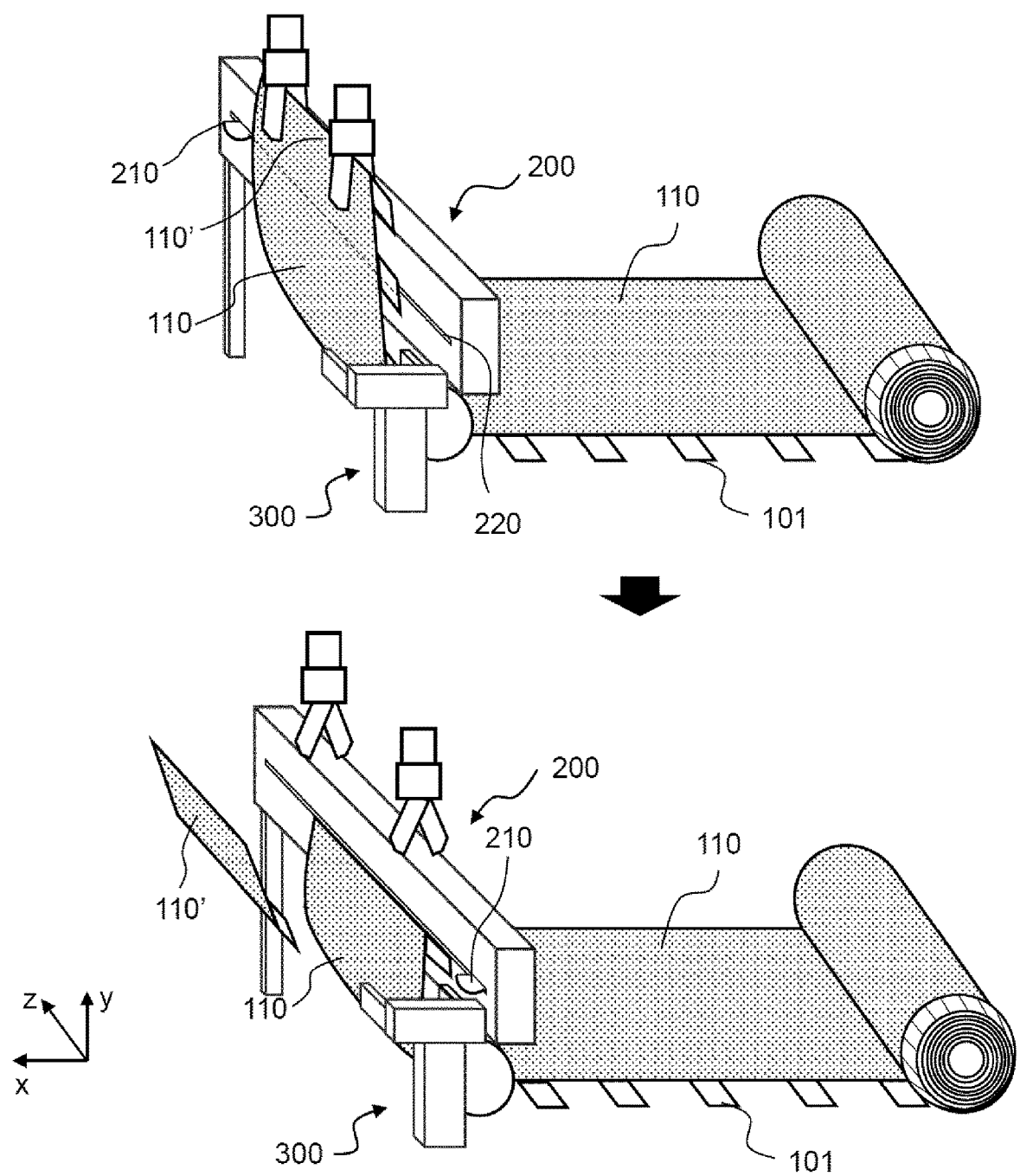
FIG. 2 is a perspective view showing a process in which a first electrode sheet shown in FIG. 1 is cut using the electrode roll connection automation apparatus of FIG. 1 after passing through an electrode tab sensing unit.

FIG. 2 is a perspective view showing a process in which the first electrode sheet of FIG. 1 is cut after passing through the electrode tab sensing unit.

Referring to FIG. 2, the distance between the electrode tabs is measured while the first electrode sheet 110 passes through the electrode tab sensing unit 300, and the tip of the start portion of the first electrode sheet 110 is attached to the connection unit 200.

The connection unit 200 may fix the first electrode sheet 110 by suctioning.

The connection unit 200 includes a cutter 210 configured to cut the tip of the start portion of the first electrode sheet 110 such that the distance between the electrode tabs measured by the electrode tab sensing unit is maintained when the first electrode sheet 110 and the second electrode sheet are connected to each other.

The cutter 210 may cut the first electrode sheet 110 while moving along a slit 220 formed in the connection unit.

When the first electrode sheet and the second electrode sheet are connected to each other, the size of a unit electrode manufactured from the first electrode sheet and the size of a unit electrode manufactured from the second electrode sheet must be uniformly maintained. To this end, a method of measuring the distance between the electrode tabs using the electrode tab sensing unit, calculating the portion of the first electrode sheet to be cut such that the distance between the electrode tabs is uniformly maintained, and cutting the tip of the start portion of the first electrode sheet based on the calculation is used.

In connection therewith, the width of the electrode tab at the tip of the end portion of the second electrode sheet and the width of the electrode tab at the tip of the start portion of the first electrode sheet are cut so as to be 50% of the width of the other electrode tabs such that the distance between the electrode tabs is uniform when the first electrode sheet and the second electrode sheet are connected to each other. When the second electrode sheet and the first electrode sheet are connected to each other, therefore, the electrode tab of the connection portion of the second electrode sheet and the electrode tab of the connection portion of the first electrode sheet are connected to each other, whereby an electrode tab having a size equal to the width of the other electrode tabs may be formed.

Consequently, a unit electrode formed from the first electrode sheet and a unit electrode formed from the second electrode sheet may have the same pitch formed in parallel to the moving direction of the first electrode sheet and the second electrode sheet.

The pitch means the size of the electrode in a lateral direction, which is perpendicular to a direction in which the electrode tab protrudes.

Even though the electrode tab sensing unit is used, however, there is limitation in equalizing the size of the unit electrode in a z-axis direction, which is perpendicular to the moving direction of the first electrode sheet and the second electrode sheet.

In the electrode roll connection automation apparatus, therefore, recesses may be formed in an outer edge of the first electrode sheet at which no electrode tabs are formed, which is one of opposite side outer edges of the first electrode sheet in the moving direction thereof, and an EPC sensor configured to sense the position of the recesses may be further included.

Figure 3:
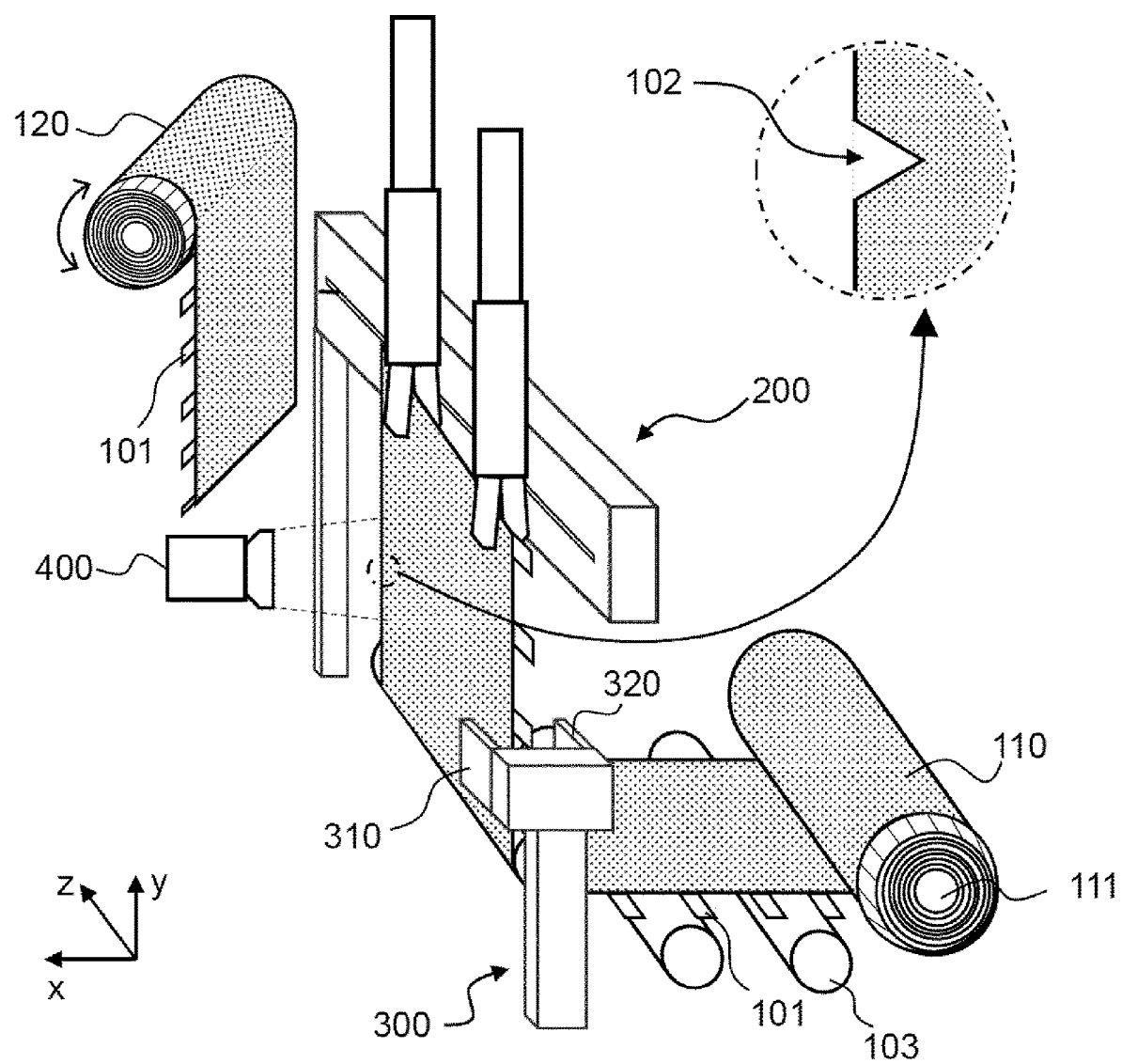
FIG. 3 is a perspective view showing the electrode roll connection automation apparatus of FIG. 1 with an EPC sensor in accordance with another embodiment.

In connection therewith, FIG. 3 is a perspective view showing the electrode roll connection automation apparatus including the EPC sensor.

Referring to FIG. 3, the electrode tabs 101 are formed at a first tip, which is one of opposite tips of the first electrode sheet 110 in the moving direction thereof, and the recesses 102 are formed at a second tip.

The electrode tab sensing unit 300 may measure the distance between the electrode tabs in order to equalize the pitch of the unit electrode.

The EPC sensor 400, which senses the position of the recess formed in the first electrode sheet 110, may inspect whether the second tip of the first electrode sheet coincides with the second tip of the second electrode sheet when the first electrode sheet and the second electrode sheet are connected to each other.

In the case in which the second tips of the first electrode sheet and the second electrode sheet do not coincide with each other as the result of measurement of the EPC sensor, the connection unit that fixes the first electrode sheet may be moved in a z-axis direction to align the first electrode sheet and the second electrode sheet in the z-axis direction. At this time, it is preferable for deviation in alignment of the first electrode sheet and the second electrode sheet in the z-axis direction to be within 1 mm.

Figure 4:
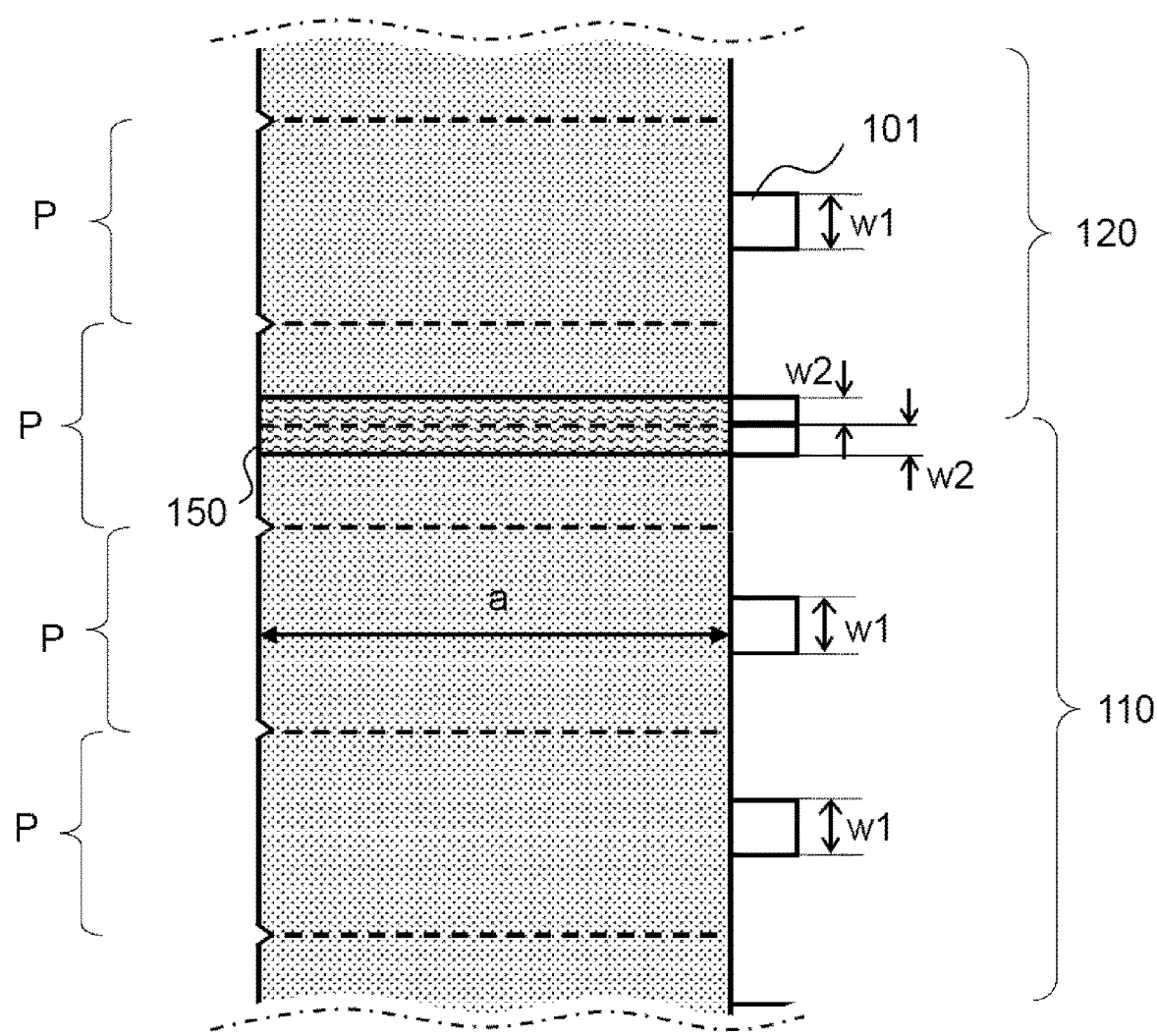
FIG. 4 is a plan view showing the portion at which the first electrode sheet and a second electrode sheet both shown in FIG. 1 are connected to each other.

FIG. 4 is a plan view showing the portion at which the first electrode sheet and the second electrode sheet are connected to each other.

Referring to FIG. 4, the first electrode sheet 110 is located below, the second electrode sheet 120 is located above, and the first electrode sheet and the second electrode sheet are connected to each other via a tape 150 in a state of being disposed so as not to overlap each other.

The width w2 of one of the electrode tabs connected to each other via the tape 150 is 50% of the width w1 of the other electrode tabs that are not cut and connected. Two electrode tabs connected to each other via the tape are disposed adjacent to each other, whereby an electrode tab having the same size as the width w1 of the other electrode tabs may be formed.

Consequently, the width P of the unit electrodes may be formed so as to have a uniform value.

Figure 5:
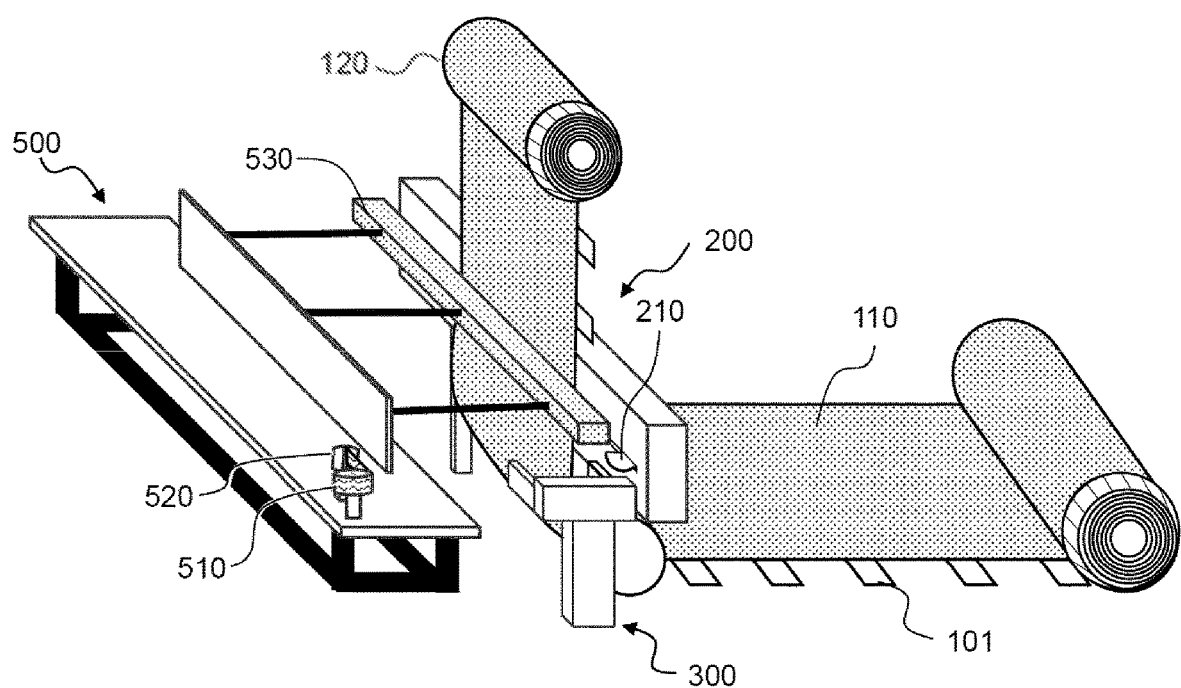
FIG. 5 is a perspective view showing a process of connecting the first electrode sheet and the second electrode sheet to each other using a tape attachment unit in accordance with another embodiment.

FIG. 5 is a perspective view showing a process of connecting the first electrode sheet and the second electrode sheet to each other using a tape attachment unit.

Referring to FIG. 5, the tape attachment unit 500 includes a supply portion 510 configured to supply a tape, a gripper 520 configured to transfer the tape supplied by the supply portion 510 to an attachment portion 530, and the attachment portion 530 being configured to move to the portion at which the first electrode sheet and the second electrode sheet are connected to each other in a state of fixing the tape. In addition, the gripper 520 may be provided with a tape cutter (not shown) configured to cut the tape.

The gripper 520 grips a tip of a tape roll, and disposes the tape such that a non-adhesive surface of the tape is located at the outer surface of the attachment portion 530. At this time, the attachment portion 530 fixes the non-adhesive surface of the tape by suctioning. Suctioning of the attachment portion may be performed in the same manner as the suction portion of each of the first connection unit and the second connection unit. A vacuum decompression suctioning method may be used.

The gripper 520 returns to the position before the tape is disposed at the attachment portion 530, and the tape withdrawn from the tape roll is cut in a state of being gripped. At this time, the tape is cut to a length necessary to be attached to the connection portions of the electrode sheets and is fixed to the attachment portion 530 by suctioning.

The attachment portion 530 is movable by a transfer means and may move to the connection portions of the first electrode sheet and the second electrode sheet in order to attach the tape to the connection portions.

An automatic electrode roll connection method using the electrode roll connection automation apparatus includes (a) a step of unwinding a first electrode sheet, (b) a step of measuring the distance between electrode tabs while the first electrode sheet passes through the electrode tab sensing unit, (c) a step of cutting a tip of a start portion of the first electrode sheet based on the distance between the electrode tabs, and (d) a step of connecting the first electrode sheet and a second electrode sheet to each other.

Step (b) may be performed using a sensor capable of measuring the distance between the electrode tabs. Optionally, step (b) may be performed together with a process of sensing the position of recesses of the first electrode sheet.

In the electrode sheets connected to each other using the automatic electrode roll connection apparatus and the automatic electrode roll connection method, the width of a unit electrode formed at the connection portions of the first electrode sheet and the second electrode sheet may be formed so as to be equal to the width of a unit electrode of the first electrode sheet and the width of a unit electrode of the second electrode sheet.

In an electrode manufacturing process performed as a roll-to-roll process, therefore, a process of connecting electrode sheets to each other is rapidly and accurately performed, whereby work efficiency may be remarkably improved while a defect rate may be reduced.

Those skilled in the art to which the present invention pertains will appreciate that various applications and modifications are possible within the category of the present invention based on the above description.

DESCRIPTION OF REFERENCE NUMERALS

101: Electrode tab
102: Recess
103: Transfer roller
110, 110': First electrode sheets
111: First roller
120: Second electrode sheet
121: Second roller
150: Tape
200: Connection unit
210: Cutter
220: Slit
300: Electrode tab sensing unit
310: Transmitter
320: Receiver
400: EPC sensor
500: Tape attachment unit
510: Supply portion
520: Gripper
530: Attachment portion As is apparent from the above description, an electrode roll connection automation apparatus according to the present invention is configured such that a process of connecting electrode sheets to each other is automatically performed, whereby it is possible to connect the electrode sheets to each other so as to have uniform quality irrespective of skill of a worker.

In addition, since an electrode tab sensing unit is included, it is possible to connect the electrode sheets to each other such that the width of electrode tabs is uniformly maintained.

In addition, since an EPC sensor is used, it is possible to connect a first electrode sheet and a second electrode sheet to each other such that the first electrode sheet and the second electrode sheet are uniformly aligned in a moving direction thereof.

Consequently, it is possible to prevent manufacture of defective unit electrodes due to a difference in width between the electrode tabs during a cutting process for manufacturing unit electrodes.

The invention claimed is:

1. An electrode roll connection automation apparatus comprising:
   a first supply unit configured to supply a first electrode sheet on which electrode tabs are formed;
   a second supply unit configured to supply a second electrode sheet on which electrode tabs are formed;
   a connection unit configured to connect the first electrode sheet and the second electrode sheet to each other; and
   an electrode tab sensing unit disposed between the first supply unit and the connection unit and configured to measure a distance between the electrode tabs,
   wherein a tip of a start portion of the first electrode sheet and a tip of an end portion of the second electrode sheet each extend through respective ones of the electrode tabs,
   the respective ones of the electrode tabs together having a combined width equal to widths of remaining ones of the electrode tabs of the first electrode sheet and the second electrode sheet.

2. The electrode roll connection automation apparatus according to claim 1, wherein the second supply unit is configured for unwinding and thereby supplying the second electrode sheet for connection with the first electrode sheet, and
   wherein the second supply unit is configured for rewinding the first electrode sheet and the second electrode sheet after the first electrode sheet and the second electrode sheet are connected to each other.

3. The electrode roll connection automation apparatus according to claim 1, wherein the electrode tab sensing unit comprises a transmitter configured to transmit a signal and a receiver configured to receive the signal, the transmitter and the receiver facing each other, and
   wherein the electrode tab sensing unit measures a distance between the electrode tabs of the first electrode sheet while the electrode tabs pass between the transmitter and the receiver.

4. The electrode roll connection automation apparatus according to claim 1, wherein the connection unit comprises a cutter configured to cut the tip of the start portion of the first electrode sheet such that the distance between the electrode tabs measured by the electrode tab sensing unit is maintained when the first electrode sheet and the second electrode sheet are connected to each other.

5. The electrode roll connection automation apparatus according to claim 1, further comprising a tape attachment unit configured to connect the first electrode sheet and the second electrode sheet to each other.

6. The electrode roll connection automation apparatus according to claim 1, wherein a recess is formed in an outer edge of the first electrode sheet at which no electrode tabs are formed, the outer edge being one of opposite side outer edges of the first electrode sheet extending in a moving direction of the first electrode sheet, and
   wherein the electrode roll connection automation apparatus further comprises an edge position control (EPC) sensor configured to sense a position of the recess.

7. The electrode roll connection automation apparatus according to claim 6, wherein the moving direction of the first electrode sheet or a moving direction of the second electrode sheet is adjusted in response to a sensing of the position of the recess by the EPC sensor.

8. An automatic electrode roll connection method using the electrode roll connection automation apparatus according to claim 1, the automatic electrode roll connection method comprising:
   (a) unwinding the first electrode sheet;
   (b) measuring the distance between the electrode tabs while the first electrode sheet passes through the electrode tab sensing unit; and
   (c) cutting the tip of the start portion of the first electrode sheet based on the distance between the electrode tabs.

9. The automatic electrode roll connection method according to claim 8, wherein step (b) comprises measuring the distance between the electrode tabs with a sensor.

10. The automatic electrode roll connection method according to claim 8, further comprising, together with step (b), sensing a position of a recess of the first electrode sheet.

11. Electrode sheets connected to each other using the electrode roll connection automation apparatus according to claim 1, wherein a width of a unit electrode formed at connection portions of the first electrode sheet and the second electrode sheet is equal to a width of a unit electrode of the first electrode sheet and a width of a unit electrode of the second electrode sheet.

12. The automatic electrode roll connection method according to claim 8, further comprising:
   (d) connecting the first electrode sheet and a second electrode sheet to each other, thereby forming a combined tab from the respective ones of the electrode tabs, the combined tab having the combined width equal to the widths of the remaining ones of the electrode tabs of the first electrode sheet and the second electrode sheet.

13. The automatic electrode roll connection method according to claim 12, further comprising:
   (e) cutting the connected electrode sheets into unit electrodes.

* * * * *